US009282294B2

(12) United States Patent
Nefedov et al.

(10) Patent No.: US 9,282,294 B2
(45) Date of Patent: Mar. 8, 2016

(54) INTEGRATED SYSTEM FOR MEDIA PLAYBACK DURING STARTUP

(71) Applicant: QNX Software Systems Limited, Kanata (CA)

(72) Inventors: Mikhail Nefedov, Kanata (CA); Etienne Belanger, Kanata (CA)

(73) Assignee: 2236008 Ontario, Inc., Waterloo, Ontario (CA)

( * ) Notice: Subject to any disclaimer, the term of this patent is extended or adjusted under 35 U.S.C. 154(b) by 428 days.

(21) Appl. No.: 13/790,500

(22) Filed: Mar. 8, 2013

(65) Prior Publication Data
US 2014/0168428 A1     Jun. 19, 2014

Related U.S. Application Data

(60) Provisional application No. 61/739,120, filed on Dec. 19, 2012.

(51) Int. Cl.
*H04N 7/18*     (2006.01)
(52) U.S. Cl.
CPC ..................................... *H04N 7/18* (2013.01)

(58) Field of Classification Search
None
See application file for complete search history.

(56) References Cited

U.S. PATENT DOCUMENTS

| | | | | |
|---|---|---|---|---|
| 2006/0125919 A1* | 6/2006 | Camilleri | ................. | B60R 1/00 348/148 |
| 2008/0030311 A1* | 2/2008 | Dayan | .................... | B60K 35/00 340/435 |
| 2010/0312630 A1* | 12/2010 | Krutchik | ................. | G06Q 30/02 705/14.35 |
| 2012/0044351 A1* | 2/2012 | Kook | ..................... | B60K 35/00 348/148 |
| 2012/0154591 A1* | 6/2012 | Baur | ......................... | B60R 1/00 348/148 |

* cited by examiner

*Primary Examiner* — Kate Luo
(74) *Attorney, Agent, or Firm* — Brinks Gilson & Lione

(57) ABSTRACT

A system and method are provided for playing a media stream while a media system starts up. Media hardware, such as a display controller, may play media. A media driver may initialize the media hardware. A media module may receive the media stream from a media source. The media module and the display driver may start up before startup of the media system completes. The media module may provide the media stream directly or indirectly to the media hardware before and after startup of the media system completes without an interruption in playing of the media stream.

17 Claims, 3 Drawing Sheets

INTEGRATED SYSTEM FOR MEDIA PLAYBACK DURING STARTUP

This application claims priority under 35 U.S.C. §119(e) to U.S. Application No. 61/739,120, "INTEGRATED SYSTEM FOR MEDIA PLAYBACK DURING STARTUP" filed Dec. 19, 2012, the entire contents of which are incorporated by reference.

BACKGROUND

1. Technical Field

This application relates to displaying or otherwise playing media streams and, in particular, to displaying or otherwise playing media streams during startup of a media system.

2. Related Art

A backup camera is now a common feature in vehicles. Safety standards in some countries have requirements for backup cameras. For example, the standards may require displaying video from the backup camera to a driver within a half of a second of putting a vehicle into reverse gear. In another example, the standards may require continuously displaying the video from the backup camera to the driver. If a portion of the video is missing or a frame is dropped, then the standards may require stopping the display of the video. Stopping display of the video may prevent the driver from relying on video that does not necessarily accurately represent what is behind the vehicle.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

An integrated graphics system installed in a vehicle may display a video stream received from a backup camera, and display other information, such as entertainment and navigation. In order for the integrated graphics system to start up fast enough to display the video stream from the backup camera within a time frame required by a safety standard, the integrated graphics system may be started in stages.

In a first stage, a camera module may begin to execute while the remainder of the integrated graphics system continues to load. The camera module may facilitate displaying the video stream, which is received from the backup camera, through a display controller. A display driver may also be started in the first stage. The display driver may initialize the display controller and reserve a hardware display layer in the display controller for the camera module to display the video stream received from the backup camera. The video stream from the backup camera may be displayed through the reserved hardware display layer while any remaining portions of the integrated graphics system continue to load.

In a second stage, the remaining components of the integrated graphics system may be loaded and executed. As the graphics system starts, the graphics system may attempt to start the display driver. In response to a determination that the display driver has already been started, the graphics system may attach to the already operating and initialized display driver. In order to avoid any interruption in the display of the video from the backup camera, control of the hardware display layer used for the video stream may not be returned to the graphics system until after the backup camera is stopped or the vehicle is taken out of reverse gear. In some examples, the hardware display layer used for the video stream is not returned to the control of the fully started graphics system.

Figure 1:
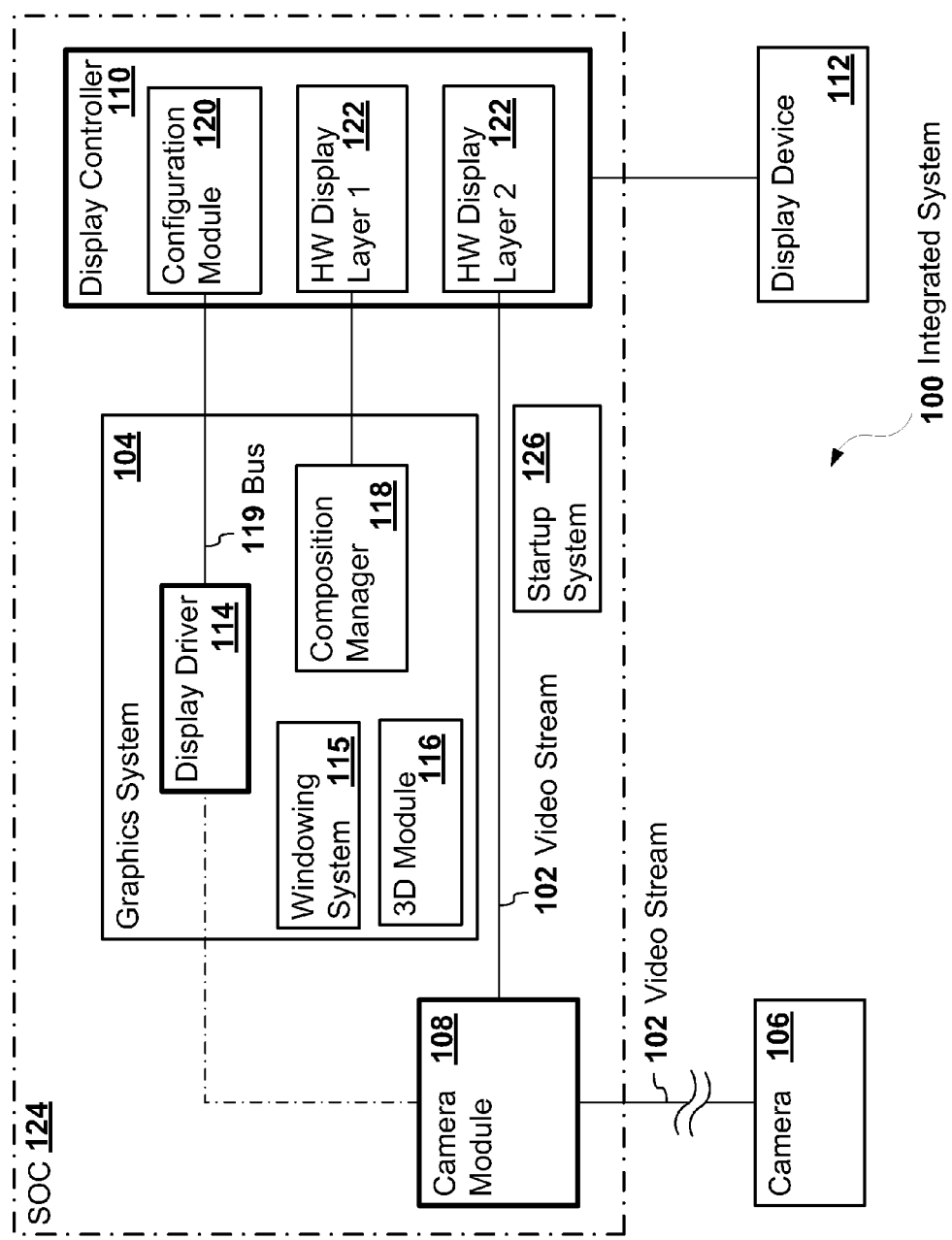
FIG. 1 illustrates a system for displaying a video stream while a graphics system starts up.

FIG. 1 illustrates an integrated system 100 for displaying a video stream 102 while a graphics system 104 starts up. The integrated system 100 may include a camera 106, a camera module 108, the graphics system 104, a display controller 110, and a display device 112.

The camera 106 may be any type of camera that generates the video stream 102. For example, the camera 106 may be a digital or analog camera. The camera 106 may positioned anywhere in or on a vehicle. For example, the camera 106 may be a backup camera mounted at the rear of the vehicle.

The camera module 108 may be any component that receives the video stream 102 from the camera 106 and directly or indirectly provides the video stream 102 to the display controller 110. The camera module 108 may include an application that runs in an operating system or any other type of software program. The video stream 102 may include a series of images or frames that are time sequenced.

The graphics system 104 may be the portion of an operating system that handles graphics processing for applications executed on the operating system. The graphics system 104 may implement an applications programming interface (API) with which an application may provide an image or a video to the media hardware 208. The graphics system 104 may include graphics components, such as a display driver 114, a windowing system 115, a 3D module 116, a composition manager 118, and/or any other component that performs computer graphics related functions. The display driver 114 may be any device driver that controls the display controller 110. The display driver 114 may include software that communicates with the display controller 110 through a bus 119 or communications subsystem. In some examples, the display driver 114 may be hardware-dependent and operating-system-specific. The display driver 114 may implement an API (application programming interface) that components may call in order to communicate with the display controller 110. The windowing system 115 may be a component of a graphical user interface (GUI) that implements windowing and/or supports an implementation of windowing, and provides an abstraction layer, in the form of an applications programming interface (API), for graphics hardware and, in some examples, user input devices, such as a keyboard and a mouse. The composition manager 118 may be a component that combines two or more images to form a single composited image.

The display controller 110 may be any hardware that reads an image and/or series of images from memory, or otherwise receives the image and/or series of images, and causes the image and/or series of images to be displayed on the display device 112. Examples of the display controller 110 may include a controller that drives an LCD (liquid crystal display) panel with a VGA (video graphics array) format, a controller that drives a LCD and/or a LED panel at a resolution of 2048×1152, and a controller that drives a HDMI® (High-Definition Multimedia Interface) or DVI (Digital Visual Interface) port (HDMI is a registered trademark of HDMI Licensing L.L.C. CORPORATION of Sunnyvale, Calif.).

The display controller 110 may include a configuration module 120, two or more hardware display layers 122, such as hardware display layer 1 and hardware display layer 2. The configuration module 120 may be any component that configures functionality of the display controller 110. The configuration module 120 may provide an interface through which the display driver 114 (or other driver external to the display controller 110) may configure the functionality of the display controller 110. For example, the configuration module 120 may control timings used to enable the display device 112. In another example, the configuration module 120 may control how the hardware display layers 122 are blended together to form a combined image that is displayed on the display device 112.

During operation of the integrated system 100, the integrated system 100 may startup. A startup may occur when a computing device comprising at least a portion of the system 100 is powered on. For example, the startup may occur when a key is turned in an ignition of a vehicle in which the system 100 is installed. A startup of the system 100 may include starting one or more subsystems of an operating system. For example, the graphics system 104 may be a subsystem of the operating system.

Even starting just the graphics system 104 may take several seconds or longer. If the vehicle is turned on and is immediately put in reverse gear, then the graphics system 104 may not start soon enough to display the video stream 102 from the camera 106 within a time frame required by a safety standard.

However, when the system 100 is starting, the display driver 114 and the camera module 108 may be started prior to the graphic system 104 or prior to the completion of the startup of the graphic system 104. The display driver 114 and the camera module 108 may start within the time frame required by the safety standard if started prior to the graphic system 104 or prior to the completion of the startup of the graphic system 104.

When the display driver 114 starts, the display driver 114 may configure the settings of the configuration module 120 so that one of the hardware display layers 122, such as hardware display layer 2, is displayed on the display device 112. When the camera module 108 starts, the camera module 108 may start the camera 106, start the display driver 114, start receiving the video stream 102 from the camera 106, and start providing the video stream 102 to hardware display layer 2. The camera module 108 may provide the video stream 102 directly to hardware display layer 2. By providing the video stream 102 directly to hardware display layer 2, the camera module 108 may bypass the display driver 114. Alternatively or in addition, the camera module 108 may provide the video stream 102 indirectly to hardware display layer 2 via the display driver 114. The display controller 110 may cause the video stream 102 written to hardware display layer 2 to be displayed on the display device 112. The display driver 114 and the camera module 108 may start and be loaded and ready to execute within the time frame required by the safety standard. Other components, such as the graphics system 104, may continue to load while the camera module 108 provides the video stream 102 to the hardware layer 2 and the display controller 110 causes the video stream 102 to be displayed on the display device 112.

After the components of the graphics system 104 are loaded, then the components may be executed. The graphics system 104 may attempt to start the display driver 114, which may indicate to the graphics system 104 that the display driver 114 is already initialized and executing. Instead of directing the display driver 114 to initialize the display controller 110 for a second time, the graphics system 104 may begin to utilize the display driver 114 without reinitializing the display controller 110. The graphics system 104 may not adjust any setting that would interrupt the video stream 102 that is being provided to hardware display layer 2 and displayed in the display device 112. When the video stream 102 no longer is being displayed because of an event, such a transmission of a vehicle switching out of reverse gear, then the graphics system 104 may adjust settings that would otherwise interrupt the video stream 102.

In one example, the graphics system 104 may not use hardware display layer 2 or whichever one of the hardware display layers 122 that receives the video stream 102 from the camera module 108. Instead, hardware display layer 2 may be reserved for exclusive use by the camera module 108 for as long as the graphics system 104 remains executing. In an alternative example, the graphics system 104 may start using and/or controlling hardware display layer 2 after the vehicle has moved out of reverse gear if the graphics system 104 is fully started or started to a point where the graphics system 104 is useable by the camera module 108. In either example, the graphics system 104 may not immediately take control of hardware layer 2 when starting so as not to interrupt the display of the video stream 102.

A startup system 126 of the computing device that includes at least a portion of the integrated system 100 illustrated in FIG. 1 may control the startup of one or more of the components 108, 104, and 114 of the integrated system 100. For example, the startup system 126 may start the camera module 108, and then, in turn, the camera module 108 may start the display driver 114 and the camera 106. In an alternative example, the startup system 126 may start the display driver 114, the camera 106, and the camera module 108. The startup system 126 may start the graphics system 104 and other components. The startup system 126 may be a portion of an operating system that controls how applications and/or components of the operating system load into memory on boot up. The startup system 126 may include configuration files, registry entries, scripts, and/or any other mechanism for controlling how components and/or applications start when the operating system starts up. The operating system may, in some examples, include a microkernel and drivers. The microkernel may startup relatively quickly. The drivers may load separately from the microkernel. The microkernel, the display driver 114, and the camera module 108 may load relatively quickly, and, in any event, within the time frame required by the safety standard to start displaying video from a backup camera.

In some examples, ownership or control of the display driver 114 may switch from the camera module 108 to the windowing system 115 and/or the graphics system 104 after the windowing system 115 and/or the graphics system 104 has started. For example, the startup system 126 may start the display driver 114 and the camera module 108, and obtain process identifiers (PIDs) for the display driver 114 and the camera module 108. The startup system 126 may provide the windowing system 115 and/or the graphics system 104 with the PIDs for the display driver 114 and the camera module 108. The windowing system 115 and/or the graphics system 104 may coordinate with the camera module 108 to obtain control of the display driver 114 based on the PIDs for the camera module 108 and the display driver 114. The coordination may be performed using an inter-process communication (IPC) protocol or some other communication mechanism. Examples of IPC protocols may include anonymous pipes, named pipes, Common Object Request Broker Architecture (CORBA), Simple Object Access Protocol (SOAP), JavaScript Object Notation (JSON), or any other suitable protocol.

While the video stream 102 is displayed through one of the hardware display layers 122, the graphics system 104 may cause the display controller 110 to blend the video stream 102 in one of the hardware display layers 122 with an image or video in another one of the hardware display layers 122. For example, the display controller 110 may blend the video stream 102 with distance scale lines so that the distance scale lines are superimposed on the video stream 102 when displayed on the display device 112. The distance scale lines may indicate how far away objects represented in the video stream 102 are from the vehicle. The camera module 108 or some other module that draws the distance scale lines may direct the display controller 110 to blend the distance scale lines onto the video stream 102 via the graphics system 104. The graphics system 104 may assign one of the hardware display layers 122, such as hardware display layer 1, to the module that draws the distance scale lines.

Figure 2:
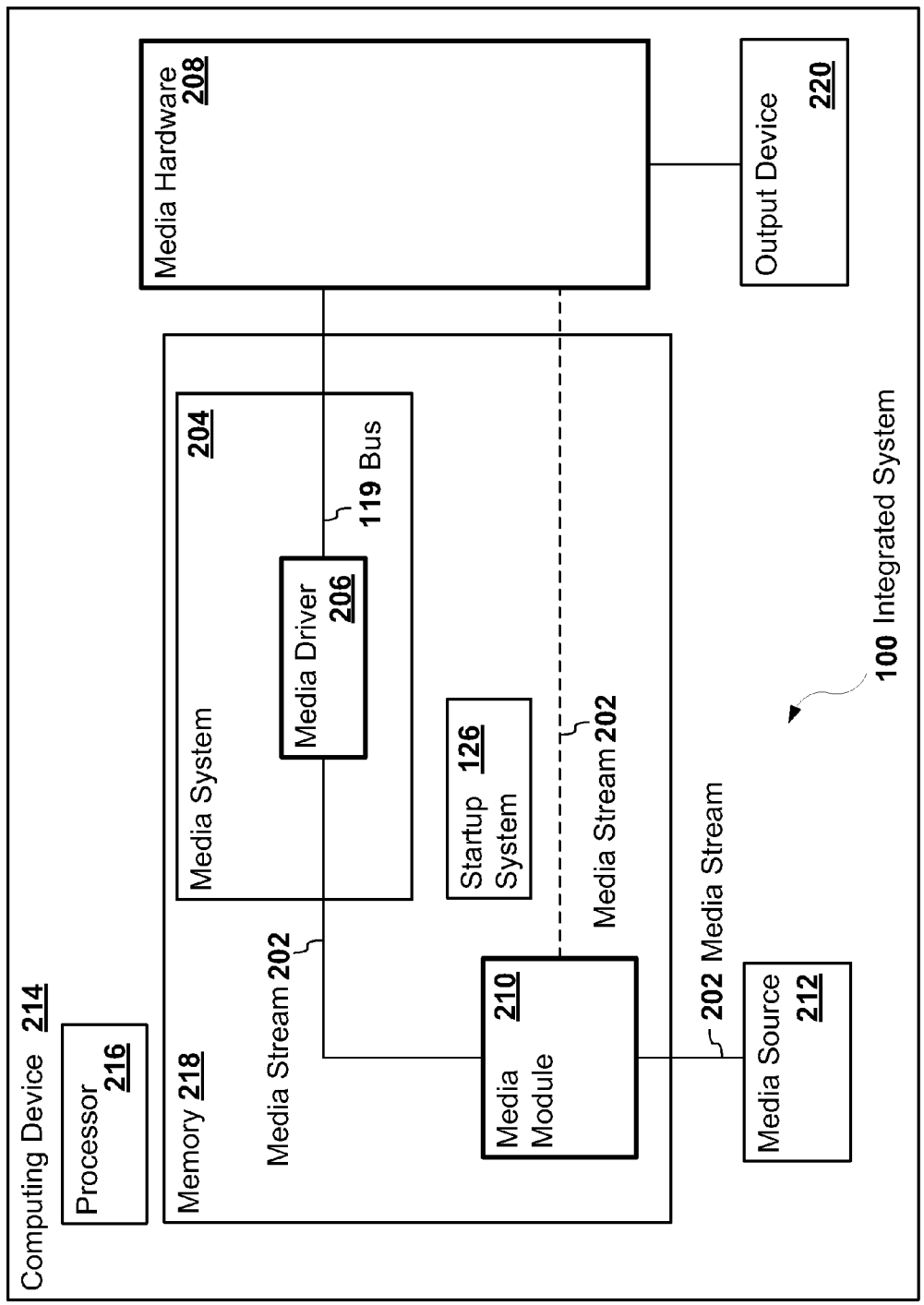
FIG. 2 illustrates a system for playing a media stream while a media system starts up.

In the example illustrated in FIG. 1, the integrated system 100 may display the video stream 102 while the graphics system 104 starts up. More generally, as illustrated in FIG. 2, the integrated system 100 may play a media stream 202 while a media system 204 starts up. In some examples, the integrated system 100 may have nothing to do with a vehicle or a camera. The integrated system 100 may include the media system 204, media hardware 208, a media source 212, a media module 210, the startup system 126, and an output device 220.

The media stream 202 may be any type of data stream. The media stream 202 may include the video stream 102. Alternatively or in addition, the media stream 202 may include an audio stream.

The output device 220 may be any device that generates an output that may be sensed by a human. For example, the output device 220 may include the display device 112 and/or one or more speakers.

The media hardware 208 may be any hardware that controls the output device 220. The media hardware 208 may include the display controller 110. Alternatively or in addition, the media hardware 208 may include an audio controller, such as an audio controller included on a computer motherboard, an audio controller included in a sound card, or any other type of control unit for the output device 220.

The media system 204 may be a component of an operating system that implements an applications programming interface (API) with which an application may provide audio and/or video to the media hardware 208. For example, the media system 204 may include the graphics system 104. Alternatively or in addition, the media system 204 may include an audio system that provides audio to the media hardware 208. The media system 204 may provide an abstraction layer for controlling and communicating with the media hardware 208.

The media system 204 may include a media driver 206. The media driver 206 may be any device driver that controls the media hardware 208. The media driver 206 may include software that communicates with the media hardware 208 through the bus 119 or other communications subsystem. In some examples, the media driver 206 may be hardware-dependent and operating-system-specific. The media driver 206 may implement an API (application programming interface) that components may call in order to communicate with the media hardware 208. The media driver 206 may control the media hardware 208 when the media driver 206 is started. The media driver 206 may, for example, include the display driver 114. Alternatively or in addition, the media driver 206 may include an audio driver.

The media module 210 may be any component that provides the media stream 202 to the media driver 206 and/or the media hardware 208 while the media system 204 starts up. The media module 210 may also provide the media stream 202 to the media driver 206 and/or the media hardware 208 after the media system 204 starts up. In some examples, the media module 210 may include the camera module 108. Alternatively or in addition, the media module 210 may include an audio module that provides one or more audio streams to the audio driver included in the media driver 206 and/or the audio controller included in the media hardware 208.

The media stream 202 may be played with the media hardware 208 before the media system 204 starts up. For example, the video stream 102 may be displayed by the display controller 110 included in the media hardware 208. Alternatively or in addition, the audio stream may be played by the audio controller included in the media hardware 208. The media stream 202 may continue to be played with the media hardware 208 after the media system 204 starts up without interrupting the playback of the media stream 202. Playing the media stream 202 may refer to displaying video and/or playing audio. In addition, playing the media stream 202 may refer to causing video and/or audio to be output by the output device 220.

In the example illustrated in FIG. 1, the camera module 108 receives the video stream 102 from the camera 106. In the general example illustrated in FIG. 2, the media module 210 may receive the media stream 202 from the media source 212. The media source 212 may be any source that generates the media stream 202 or includes information from which the media stream 202 may be generated. Examples of the media source 212 may include a DVD player, a CD player, a MPEG player, a microphone, a camera, a web camera, a file, a storage device, or any other source of media.

A computing device 214 may include all or a portion of the integrated system 100. The computing device 214 may be any device that includes a processor 216 and a memory 218. Examples of the computing device 214 may include a head unit in a vehicle, a mobile device, a smart phone, a cell phone, a tablet computer, a laptop computer, a desktop computer, an embedded device, or any other type of device comprising a type of processor.

The computing device 214 may include, for example, the processor 216, the memory 218, the media hardware 208, the media source 212, and the output device 220. The memory 218 may include the media module 210, the media system 204, and the startup system 126.

In one example, during operation of the integrated system 100, the computing device 214 may display a splash screen as the computing device 214 starts. The splash screen may include one or more simple images. The computing device 214 may not yet be fully started, but the splash screen may indicate that the computing device 214 is booting normally. When the media system 204 and/or the graphics system 104 of the computing device 214 fully starts, then the splash screen may be replaced. Alternatively, the splash screen may be more complex and not necessarily be replaced immediately after the graphics system 104 starts. Without the integrated system 100, decoders to generate a more complex splash screen may not be available until after the graphics system 104 starts. Accordingly, the system 100 may include, for example, a video decoder module in the media module 210 instead of, or in addition to, the camera module 108. The integrated system 100 may start displaying a pre-recorded video prior to the graphics system 104 of the media system 204 starting, but without the graphics system 104 interrupting the playing of the pre-recorded video after the graphics system 104 starts up. In particular, the startup system 126 may start the media module 210 before the media system 204 starts completely. The video decoder module in the media module 210 may read an encoded version of the pre-recorded video from a storage device included in the media source 212. The video decoder module may derive a decoded video stream from the encoded pre-recorded video while the graphics system 104 starts up. The video decoder module may provide the media stream 202, which includes the decoded video stream, directly to one of the hardware display layers 122 included in the media hardware 208, bypassing the media driver 206. Alternatively or in addition, the startup system 126 may start the media module 210 and the media driver 206 before the media system 204 finishes starting up. The media module 210 may provide the media stream 202 to the media hardware 208 through the media driver 206 while the media system 204 starts up.

During the startup of the media system 204, the media system 204 may determine whether the media hardware 208 is initialized. For example, the media driver 206 may indicate to the media system 204 that the media hardware 208 is initialized. In response to a determination that the media hardware 208 is initialized, the media system 204 may skip initializing the media hardware 208. For example, the media system 204 may not direct the media driver 206 to initialize the media hardware 208 in response to a determination that the media hardware 208 is initialized, but may direct the media driver 206 to initialize the media hardware 208 in response to a determination that the media hardware 208 is not initialized.

The integrated system 100 may be implemented in many different ways. For example, although some components may be shown stored in the memory 218 (for example, as logic implemented as computer-executable instructions or as data structures in memory), such logic and/or data structures may be stored on, distributed across, or read from other machine-readable storage media. The computer-readable storage media may include memories, hard disks, floppy disks, CD-ROMs, or any other type of memory from which a processor may read data. Alternatively or in addition, components that are shown stored in the memory 218, such as the media module 210, the media system 204, the startup system 126, the camera module 108, the display driver 114, the windowing system 115, and the composition manager 118, may be implemented in hardware instead of being stored in the memory.

The integrated system 100 may be implemented with additional, different, or fewer components than are illustrated in FIG. 1 or FIG. 2. For example, the integrated system 100 may include the display driver 114 but not the graphics system 104. In some examples, the integrated system 100 may not include the camera 106 and the display device 112 or any other media source or output device. In one example, the system 100 may include only the camera module 108 and the graphics system 104. The integrated system 100 may be included in any computing device, such as a mobile computing device, a laptop, a smart phone, a Personal Digital Assistant, a desktop computer, a tablet computer, an appliance, or an embedded system, such as head unit of a vehicle. The display device 112 may be external to the integrated system 100 or integrated into the computing device 214.

The integrated system 100 may include the processor 216 and the memory 218. The memory 218 may be any device for storing and retrieving data or any combination thereof. The memory 218 may include non-volatile and/or volatile memory, such as a random access memory (RAM), a read-only memory (ROM), an erasable programmable read-only memory (EPROM), or flash memory. Alternatively or in addition, the memory 218 may include an optical, magnetic (hard-drive) or any other form of data storage device.

The processor 216 may be any device that executes computer executable instructions. The processor 216 may be in communication with the memory 218. The processor 216 may also be in communication with additional components, such as the display controller 110 and the camera 106. The processor 216 may include a general processor, a central processing unit, a server device, an application specific integrated circuit (ASIC), a digital signal processor, a field programmable gate array (FPGA), a digital circuit, an analog circuit, a microcontroller, any other type of processor, or any combination thereof. The processor 216 may include one or more elements operable to execute computer executable instructions or computer code embodied in the memory 218 to perform the features of the media driver 206, the display driver 114, the media module 210, the camera module 108, the startup system 126, or any other component that may comprise computer executable instructions.

Furthermore, each one of the components of the integrated system 100 may include more, fewer, or different elements than is illustrated in FIG. 1 or FIG. 2. For example, the graphics system 104 and/or the display controller 110 may include more, fewer, or different components. Moreover, the various modules illustrated are but one example of such functionality and any other configurations of modules encompassing similar functionality are possible. As one example, the display driver 114 may not be included in the graphics system 104. Alternatively, the graphics system 104 may include a first display driver, and the camera module 108 may include a second display driver. As another example, the camera module 108 may include an analog to digital converter that converts an analog video stream 102 received from the camera 106 to a digital video stream 102 that is provided to the display controller 110.

In some examples, one or more of the components of the system 100 may be included in a System on a Chip (SOC) 124. For example, the SOC 124 may include the camera module 108, the graphics system 104, and the display controller 110. In another example, the SOC 124 may include fewer, different, or additional components. For example, the SOC 124 may include a processor, such as a general processing unit (GPU), a central processing unit (CPU), and/or a graphics processor. As another example, the SOC 124 may not include the camera module 108.

The components of the system 100 may be resident on separate hardware, such as separate removable circuit boards, or share common hardware, such as a same memory and processor for implementing instructions from the memory. Programs may be parts of a single program, separate programs, or distributed across several memories and processors.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library or a shared library such as a dynamic link library (DLL). The DLL, for example, may store code that implements all or part of the camera module 108.

Figure 3:
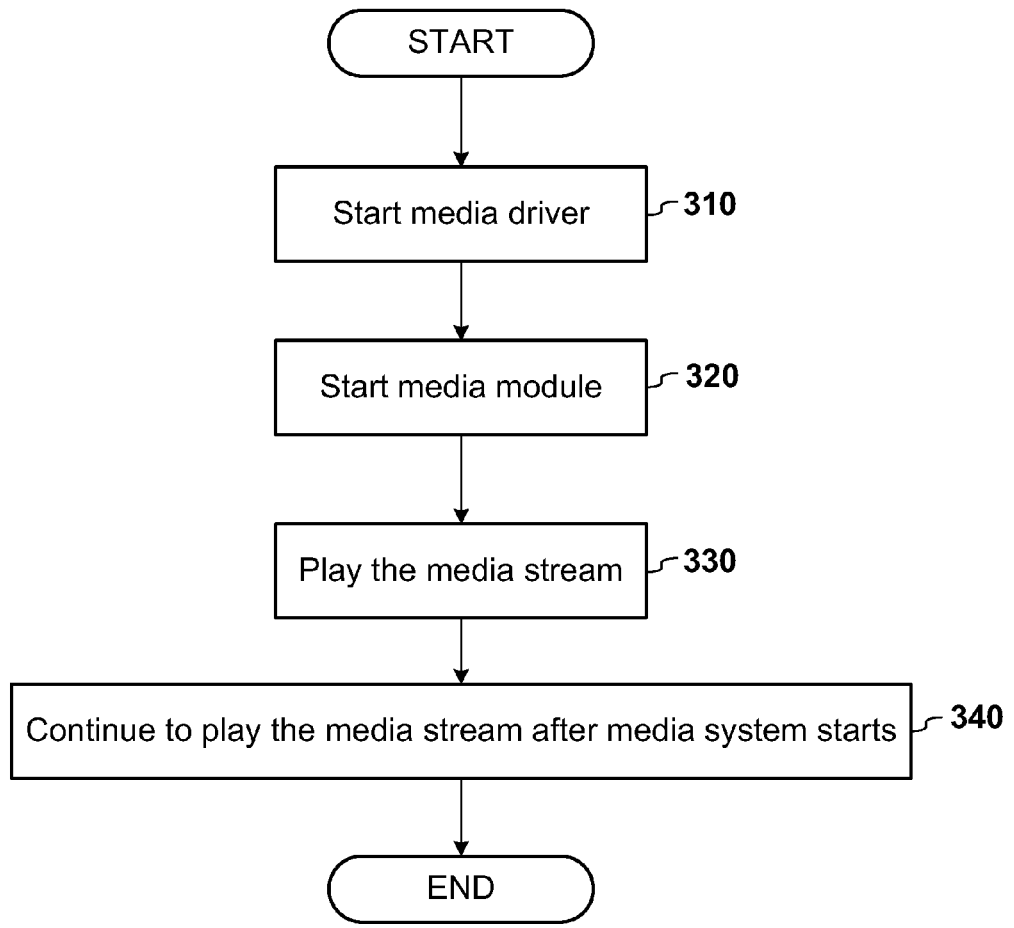
FIG. 3 illustrates a flow diagram of the logic of a system for playing a media stream while a media system starts up.

FIG. 3 illustrates a flow diagram of the logic of the integrated system 100 for playing the media stream 202, such as the video stream 102, while the media system 204, such as the graphics system 104, starts up. Operations may begin with an operation in which the media driver 206 may be started that controls media hardware (310). For example, the display driver 114 may be started that controls the display controller 110.

Operations may continue in an operation in which the media module 210, which provides the media stream 202 to the media driver 206 and/or the media hardware 208, may be started (320). For example, the camera module 108 may be started, and the camera module 108 may provide the video stream 102 to the display driver 114 and/or the display controller 110.

The media stream 202 may be played with the media hardware 208 before the media system 204 starts up (330). For example, the display controller 110 may play the video stream 102 before the graphics system 104 starts up.

The media stream 202 may continue to be played with the media hardware 208 after the media system 204 starts up (340). For example, the video stream 102 may continue to be played with the display controller 110 after the graphics system 104 starts up.

The operations may end by, for example, ceasing to play the media stream 202 when an event, such as a vehicle switching out of reverse gear, occurs. The logic may include additional, different, or fewer operations than illustrated in FIG. 3. The operations may be performed in an order different than illustrated in FIG. 3.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which may include CD-ROMs, volatile or non-volatile memory such as ROM and RAM, or any other suitable storage device. Moreover, the various modules and screen display functionality is but one example of such functionality and any other configurations encompassing similar functionality are possible.

Furthermore, although specific components of innovations were described, methods, systems, and articles of manufacture consistent with the innovations may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. A system to display camera video, the system comprising:
    a display controller comprising a configuration module, a first hardware layer, and a second hardware layer;
    a processor; and
    a memory comprising instructions executable with the processor, the instructions comprising:
    a display driver configured to initialize the display controller;
    a camera module configured to receive a video stream from a camera; and
    a graphics system configured to cause graphics to be displayed through the display controller, wherein, in a first stage, the camera module and the display driver are configured to start up before startup of the graphics system completes, and the display driver is configured to reserve the first hardware layer for the camera module to display the video stream received from the camera, wherein, in a second stage during and after the startup of the graphics system, the graphics system is further configured to provide the graphics to the second hardware layer, and wherein the configuration module is configured to control which of the first and second hardware layers is displayed and/or how the first and second hardware layers are blended together to form a combined image to be displayed.

2. The system of claim 1, wherein the camera module is further configured to provide the video stream to the first hardware layer via the display driver during the startup of the graphics system in the first stage.

3. The system of claim 1, wherein the camera module is further configured to bypass the display driver and provide the video stream directly to the first hardware layer during the startup of the graphics system in the first stage.

4. The system of claim 1, wherein the graphics system is configured to attach to the display driver during the startup of the graphics system without an initialization of the display controller in response to a determination that the display driver is started.

5. A method for playing media streams, the method comprising:
   starting a media driver that controls a media hardware when the media driver is started;
   initializing the media hardware with the media driver;
   starting a media module, wherein the media driver and the media module are started in a first stage before startup of a media system completes;
   reserving a first hardware layer of a display controller of the media hardware with the media driver for display of a media stream provided by the media module;
   providing the media stream to the media driver and/or to the first hardware layer of the display controller with the media module in a second stage before and after the startup of the media system completes, wherein the media system is a component of an operating system through which an application may provide audio and/or video other than the media stream to a second hardware layer of the display controller of the media hardware;
   playing the media stream through the first hardware layer in the second stage before and after the startup of the media system completes; and
   controlling which of the first and second hardware layers is displayed and/or how the first and second hardware layers are blended together to be displayed.

6. The method of claim 5, wherein providing the media stream comprises providing the media stream, via the media driver, from the media module to the first hardware layer of the media hardware before and after the startup of the media system completes.

7. The method of claim 5, wherein providing the media stream comprises providing the media stream with the media module directly to the first hardware layer of the media hardware before and after the startup of the media system completes.

8. The method of claim 5 further comprising determining, during the startup of the media system, whether the media driver previously initialized the media hardware, and skipping initialization of the media hardware during the startup of the media system in response to a determination that the media driver previously initialized the media hardware.

9. The method of claim 5, further comprising receiving the media stream from a backup camera.

10. The method of claim 5, further comprising generating the media stream with the media module by decoding an encoded pre-recorded video, wherein playing the media stream with the media hardware comprises causing a splash screen to be displayed from the media stream.

11. A non-transitory computer readable storage medium comprising instructions executable with a processor, the instructions comprising:
   a media system through which an application may provide audio and/or video to media hardware, the media hardware comprising a first hardware layer and a second hardware layer, wherein the application may provide the audio and/or video to the second hardware layer;
   a media driver configured to control which of the first and second hardware layers is displayed and/or how the first and second hardware layers are blended together to form a combined image to be displayed; and
   a media module configured to provide a media stream to the media driver and/or to the first hardware layer of the media hardware before and after completion of a startup of the media system, wherein startup of the media driver and the media module is completed in a first stage before the completion of the startup of the media system, wherein the media stream is played by the media hardware in a second stage after the startup of the media driver and the media module completes, wherein the media stream is played through the first hardware layer before the completion of the startup of the media system, wherein the media stream provided by the media module differs from the audio and/or video provided to the media hardware by the application, wherein the media stream continues to be played by the media hardware after the completion of the startup of the media system, and wherein the first hardware layer of the media hardware is reserved for playback of the media stream at least before the completion of the startup of the media system.

12. The computer readable storage medium of claim 11, wherein the media module and the media system are configured to communicate with the media hardware via the media driver.

13. The computer readable storage medium of claim 11, wherein the media system is configured to communicate with the media hardware via the media driver, and the media module is configured to provide the media stream to the media hardware without use of the media driver.

14. The computer readable storage medium of claim 11, wherein the media system is configured to determine, during the startup of the media system, whether the media hardware is already initialized, and wherein the media system is further configured to skip initialization of the media hardware in response to a determination that the media hardware is already initialized.

15. The computer readable storage medium of claim 11, wherein the media module is configured to receive the media stream from a camera and to provide the media stream to a display controller of the media hardware before and after the completion of the startup of the media system, wherein the media hardware is included in a head unit configured to be installed in a vehicle.

16. The computer readable storage medium of claim 11, wherein the media module comprises a video decoder module configured to derive the media stream from an encoded pre-recorded video.

17. The computer readable storage medium of claim 11, the instructions further comprising a startup system configured to start the media driver and the media module before the completion of the startup of the media system.

* * * * *